United States Patent [19]

DeNomme

[11] 4,073,386

[45] Feb. 14, 1978

[54] POWERED MATERIAL HANDLING APPARATUS

[75] Inventor: George L. DeNomme, Oxford, Conn.

[73] Assignee: The Chapin and Bangs Company, Bridgeport, Conn.

[21] Appl. No.: 762,102

[22] Filed: Jan. 24, 1977

[51] Int. Cl.[2] .............................................. B65G 35/00

[52] U.S. Cl. ................................. 214/1 F; 214/1 BB; 214/654; 214/1.7; 214/731; 214/750

[58] Field of Search ..................... 214/1 B, 1 BB, 1 F, 214/1 R, 1.6, 1.7, 731, 730, 654, 750

[56] References Cited

U.S. PATENT DOCUMENTS

| | | | |
|---|---|---|---|
| 1,587,855 | 6/1926 | Redding | 214/1.6 X |
| 1,826,489 | 10/1931 | Abbe | 214/654 |
| 2,608,315 | 8/1952 | Turner | 214/731 |
| 3,235,105 | 2/1966 | Loomis | 214/731 X |
| 3,337,066 | 8/1967 | Reed et al. | 214/731 X |
| 3,347,209 | 10/1967 | Groat | 214/731 X |

*Primary Examiner*—Frank E. Werner

*Attorney, Agent, or Firm*—H. Gibner Lehmann; K. Gibner Lehmann

[57] ABSTRACT

Powered material handling apparatus comprising an elongate carriage having two trucks which are located respectively at its ends, said trucks having wheels which are arranged to enable the carriage to travel laterally of its length along a pair of spaced-apart tracks on the floor surface. The trucks are constituted as upright structures, having vertically-movable cross-heads which are connected with each other by a pair of heavy cross beams. Power means, carried by the trucks, actuate the cross-heads to raise and lower the same and also the cross beams connected thereto. On the cross beams there are fork structures having tines which extend laterally away from the beams and are adapted to support sheared plate sections as well as other stock material. The fork structures have heavy-duty, anti-friction roller means which engage the beams and enable the fork structures to be readily moved along the latter by moderate manual power when no load is being supported. The fork structures are reinforced, and the anti-friction roller means are strongly constructed to enable these parts to withstand heavy metal loads.

13 Claims, 9 Drawing Figures

POWERED MATERIAL HANDLING APPARATUS

BACKGROUND

This invention relates to powered material handling apparatus, and more particularly to a carriage structure having material handling and cradling devices, the entire assemblage being movable along tracks and being adapted for cooperation with material working equipment such as heavy power shears and the like.

In the distribution and sale of steel stock material, such as bars, strips, sheets and the like, the problem of handling and cutting to size the stock material becomes one of not only storing the heavy steel, but also one of manipulating relatively large and massive pieces and shapes, and cutting the same to the customer's specifications. Steel warehouses employ large overhead cranes which travel on overhead tracks, heavy racking equipment and also powerful sawing and shearing machinery adapted to accommodate large stock sizes weighing thousands of pounds. Power-operated shears are used, which cut through heavy sections of steel plate so as to provide the desired sizes needed by the trade. In handling and working the stock, power-operated fork-lift trucks transport the raw and cut stock, in addition to the overhead cranes, trams and kindred devices. Roller-type supports are commonly used, mounted on fixed vertical stanchions to carry the large and heavy steel plates from which smaller pieces are to be cut. The sheared or cut portions of the steel plates are commonly delivered from the shears by powerful belt conveyors.

Heretofore a problem has existed in the handling of the cut sheet sections after the shearing thereof and removal from the shear. It was customary in some cases to locate a fork-lift truck at the discharge end of the shear to receive the heavy sheared plate sections. This involved an appreciable amount of manual labor, in directing the heavy sheared plate sections onto the lift truck, and the operation generally did not progress at a very rapid rate, in addition to requiring personnel which were physically capable of handling the heavy steel.

The above disadvantage and drawback of handling and transporting heavy, sheared steel plate sections is obviated by the present invention, which has as an object the provision of an improved sheet stock handling apparatus adapted to physically shift heavy, cut steel plates from the discharge conveyor of the shear, and to store such plates in a stacking arrangement by which they can be readily removed through the use of a fork-lift truck and transported to the desired racking or shipping station. Another object of the invention is to provide an improved, powered, material-handling apparatus as above set forth, which is especially simple in its construction and easily manipulated, while at the same time being powerful and rugged, and particularly adapted to handle heavy work and loads without malfunctioning or failure.

A feature of the invention resides in the provision of an improved material handling apparatus as above set forth, which can be readily operated by personnel of limited physical capability, since no heavy pulling or lifting operations are required of the personnel.

Still another object of the invention is to provide an improved, traveling-carriage type of material handling apparatus in accordance with the foregoing, wherein the power-supply cabling for the apparatus is so constituted and arranged that it serves a double function in automatically roping off restricted areas which might prove hazardous to personnel, during all phases of the operation of the apparatus.

Another feature of the invention resides in the provision of power-cable reeling equipment as above, wherein the cables extend along the track rails in raised locations so as to automatically cordon off areas defined by the rails.

In accomplishing the above objects the invention provides an elongate carriage structure which is movable along parallel track rails and which has spaced-apart upright truck portions at its opposite ends, provided with wheels for engagement with the rails. The carriage structure comprises framing which includes cross members that rigidly connect together the two trucks.

Each truck has a vertically movable cross-head which is shiftable in vertical guides and is operated by power means such as hydraulic cylinders. Extending between the trucks is a pair of heavy cross beams which, at their ends, are connected to the cross-heads. Operation of the powerful hydraulic cylinders can raise and lower the cross-heads and the interconnecting beams secured thereto.

Slidably carried by the cross beams are fork structures which include pulling arms and supporting tines, both extending laterally away from the beams and being adapted for pulling and stacking sheared plate sections. The fork structures have special, anti-friction roller means which are especially rugged to withstand heavy loading while at the same time enabling the fork structures to be easily shifted along the lengths of the beams by moderate manual power, when not loaded. The functioning of the apparatus is such that it can be utilized to pull heavy sheet sections from the conveyor of the power shear by virtue of the trucks being made to travel along the parallel track rails. And, the sheared plate sections can be vertically on the tines of the fork structures by a combination of the above movement with raising and lowering movement of the cross-heads on the trucks. As a consequence, the heavy work that was heretofore required by personnel at the discharge of the power shear is no longer needed, being replaced by power equipment which can be easily operated, thus enabling the handling of the material to be more quickly and reliably carried out with the likelihood of less injury to personnel, and with less physical exertion.

Other features and advantages of the invention will hereinafter appear.

In the accompanying drawings, illustrating one embodiment of the invention:

FIG. 3 is a fragmentary vertical elevational view, taken on the line 3—3 of FIG. 2.

FIG. 4 is a fragmentary elevational view taken on the line 4—4 of FIG. 2.

Figure 9:
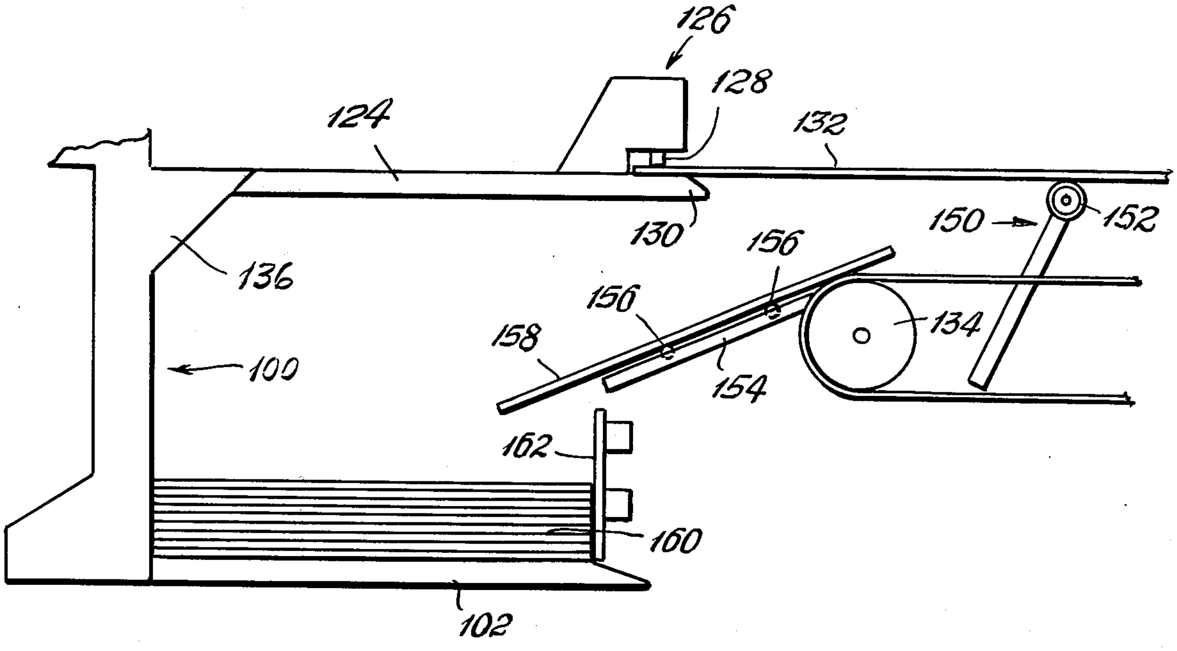

FIG. 9 is a diagrammatic representation of the fork structures of the material-handling apparatus, and of the conveyor which is located at the discharge end of the power shear. The arm portions of the fork structures are illustrated as clamping and supporting a metal plate, and the tine portions as carrying a stack of cut plates. The conveyor is shown in the process of depositing a cut plate section onto the stack.

Figure 1:
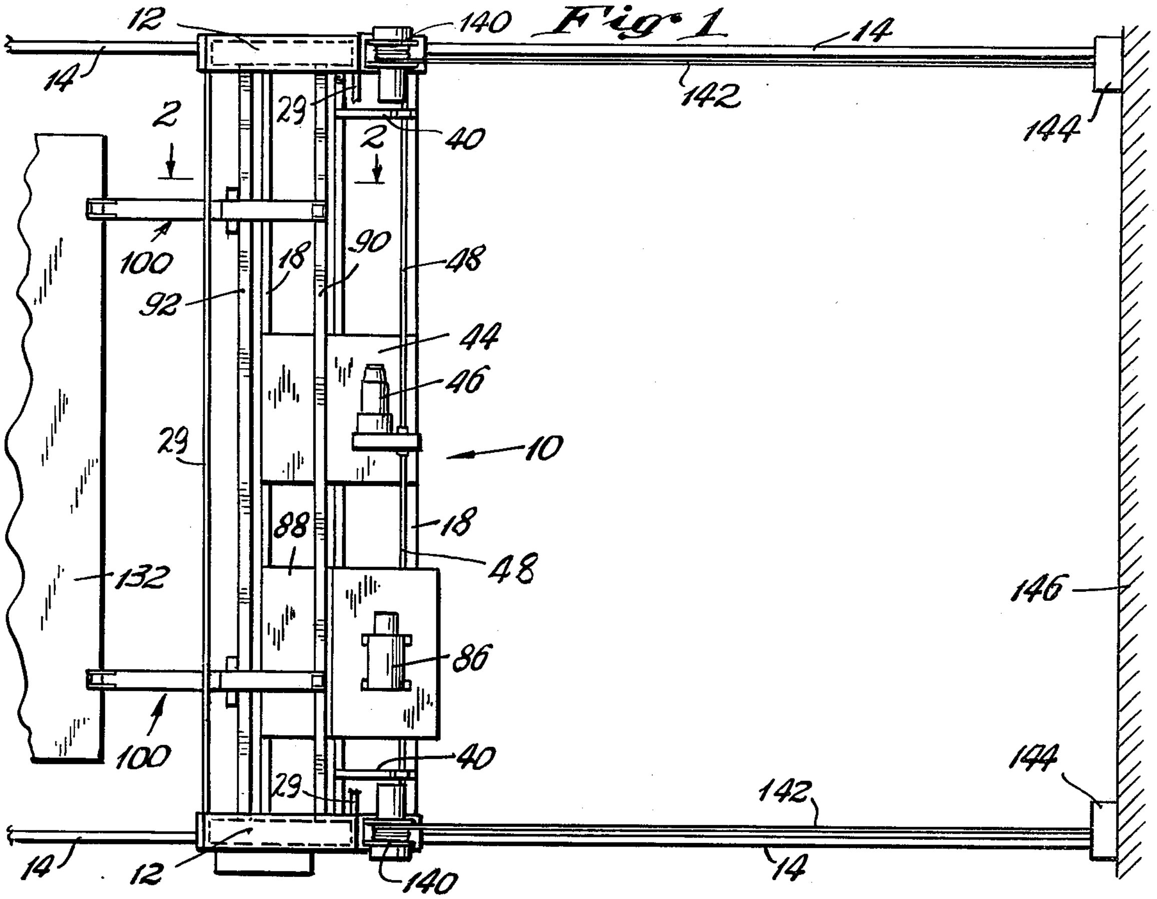
FIG. 1 is a top plan view of the improved material handling apparatus.
Figure 7:
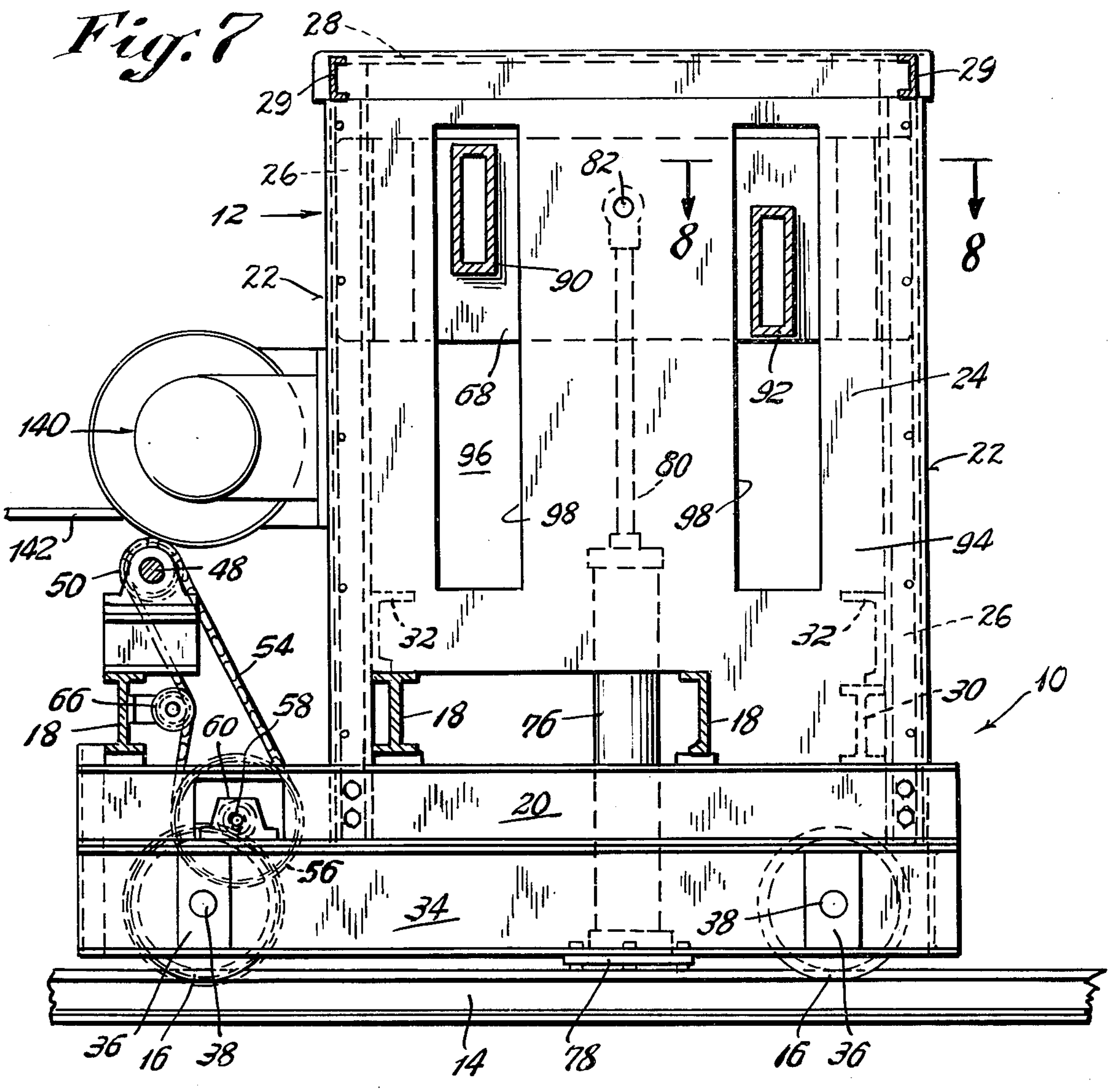
FIG. 7 is a fragmentary vertical section of the apparatus, taken on the line 7—7 of FIG. 6.

Referring first to FIG. 1, the material handling apparatus of the present invention comprises an elongate carriage generally designated by the numeral 10, said carriage having at its ends a pair of spaced-apart truck assemblages 12 which are adapted to travel along rail tracks 14 supported on the floor surface. Referring to FIG. 7, the trucks 12 are provided with flanged wheels 16, by which the trucks can travel in parallel directions on the rails. The carriage 10 is constituted essentially as a frame-like construction, having cross members 18 which rigidly connect together the trucks 12.

Figure 6:
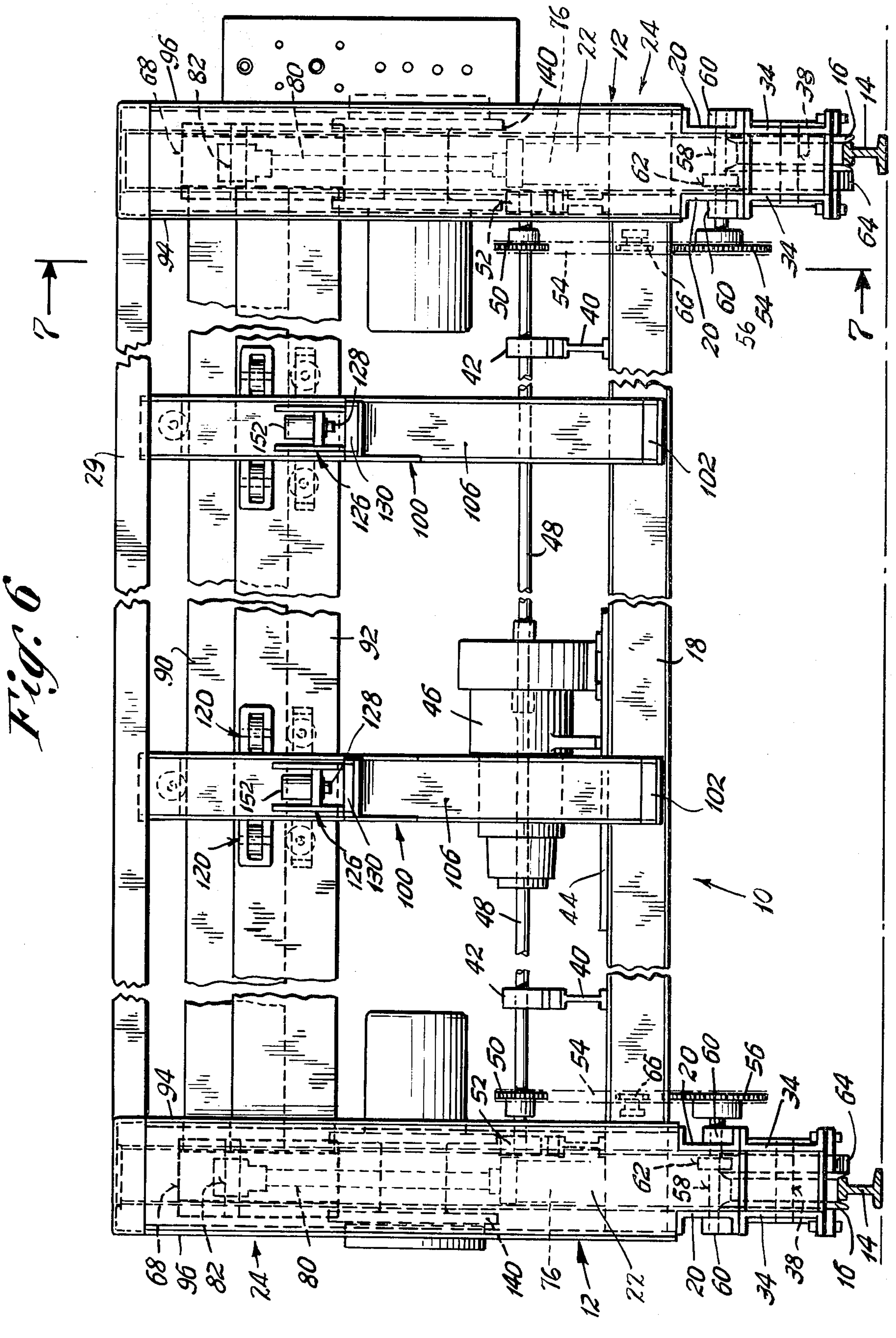
FIG. 6 is a front elevational view of the material handling apparatus.

As seen in FIG. 6, each truck comprises a pair of base channels 20 which are disposed back-to-back, said channels being secured to the cross members 18 and also carrying upright frame channels 22 which form part of upstanding housing portions 24 of the trucks.

Nested within the frame channels 22 are vertical guide or slide channels 26, the upper ends of the pair of slide channels 26 being rigidly connected together by tie members 28 and 29.

Figure 5:
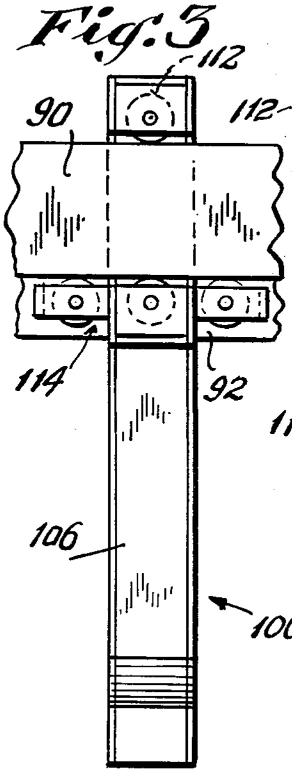
FIG. 5 is an end elevational view of the material handling apparatus of the invention.
Figure 2:
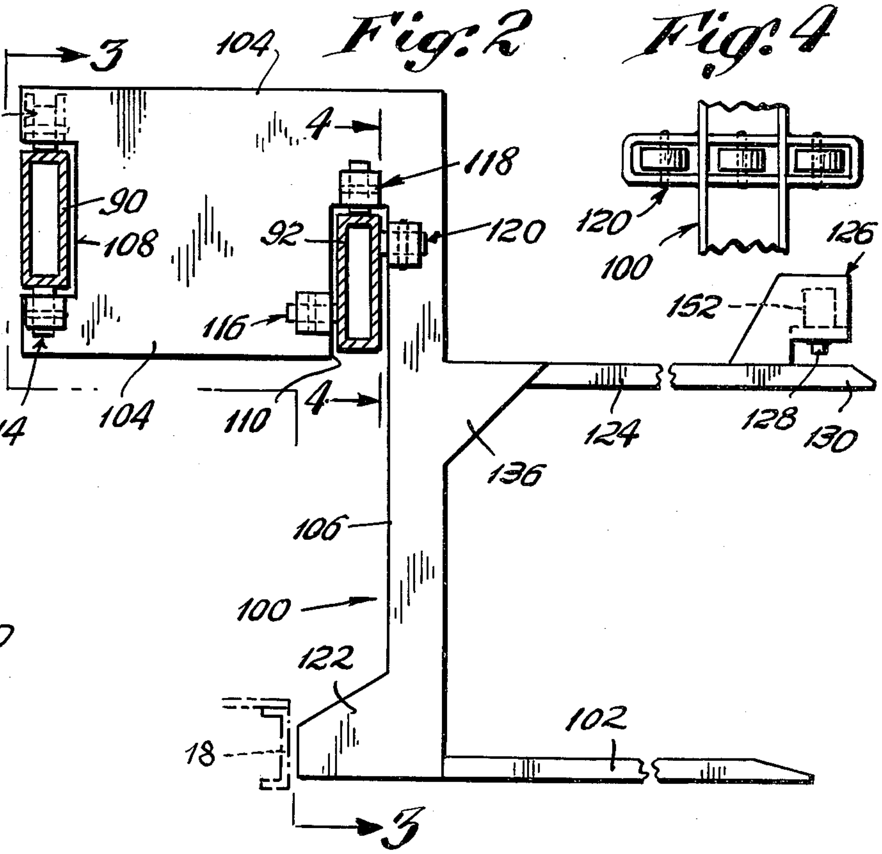
FIG. 2 is a vertical fragmentary sectional view, taken on the line 2—2 of FIG. 1.
Figure 5:
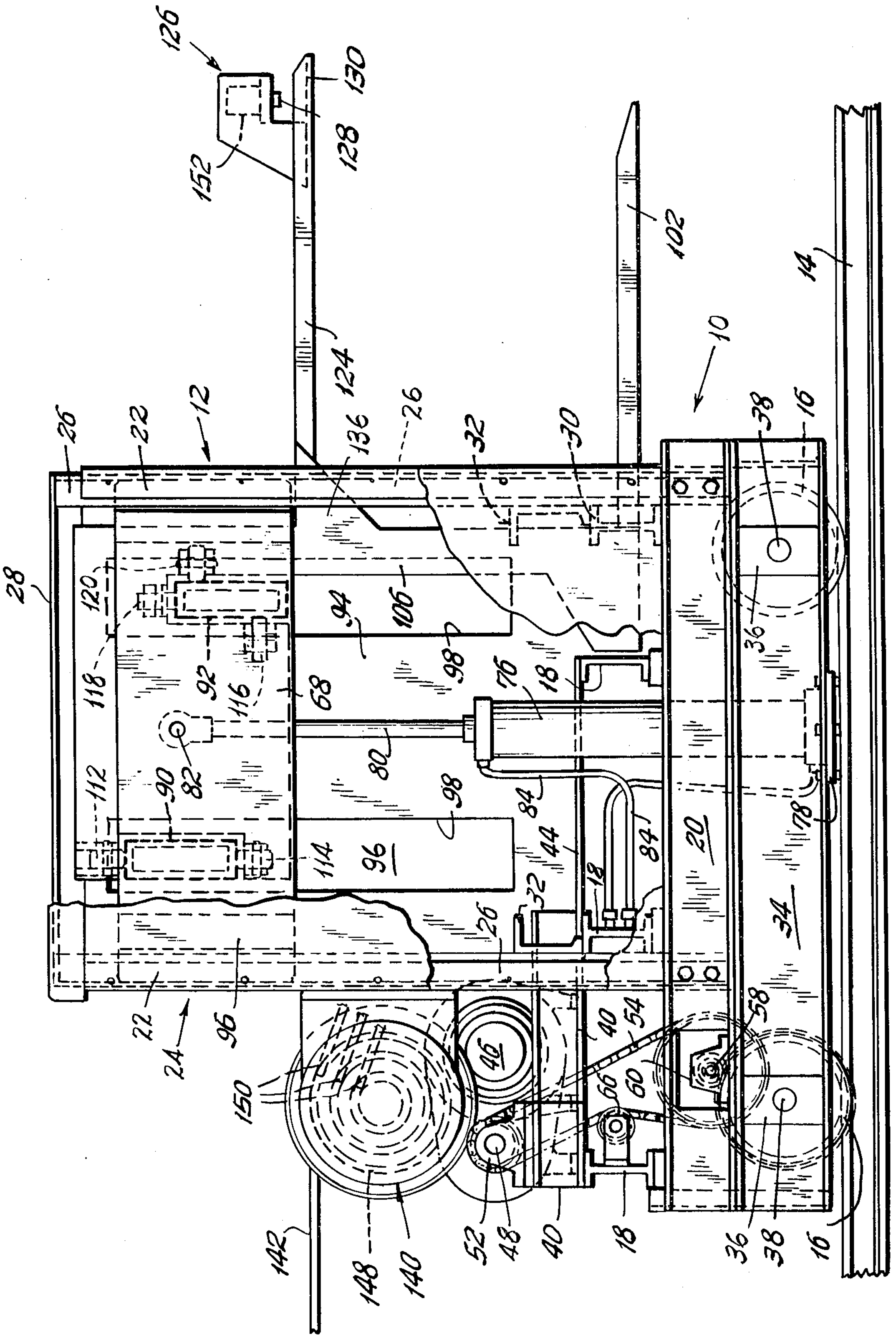

For the purpose of securing the slide channels 26 in centralized position in the frame channels 22 there are provided short I-beam and channel sections 30, 32 respectively, FIGS. 5 and 7. The sections 30, 32 are secured to the channels 26 in any suitable manner, as by welding. The carriage frame construction further comprises additional channels 34 disposed respectively below the base channels 20 and attached thereto, as by welding. Journals 36 carried by the channels 34 accommodate shafts 38 on which the wheels 16 are carried.

The carriage frame construction also includes short I-beam members 40 spanning two of the cross members 18, as seen in FIG. 5, and carrying journals 42 for a power means shortly to be described, which is operable to drive the carriage along the rails 14. Extending across the said two cross members 18 is also a bed-plate 44 on which there is carried a gear-head electric motor 46 having drive shafts 48 extending in opposite directions and passing through the journals 42. The shafts 48 carry sprockets 50 and are supported in additional journal bearings 52 mounted on the carriage 10. Chains 54 pass over the drive sprockets 50 and around driven sprockets 56 carried on jack shafts 58 turning in journal bearings 60 on the carriage. The jack shafts 58 have pinion gears 62 meshing with spur gears 64 on the shafts 38, the gears 64 being securely fastened to the wheels 16. Small idler sprockets 66 are carried by the rear cross members 18 and take up the slack in the chains 54.

By this construction the drive wheels of both trucks are driven simultaneously at exactly the same speeds and, in conjunction with the remaining wheels 16, enable the carriage 10 to travel smoothly over the rails 14.

In accordance with the present invention the trucks 12 with their upstanding housing portions 24 are provided with vertically movable cross-heads 68 each constituted as a composite structure, such cross-heads having a width in excess of the depth as clearly seen in FIG. 5.

The cross-heads 68 are formed of heavy steel side plates 70 secured together in spaced-apart relation by spacer blocks 72, said blocks having exposed runner portions 74 adapted to be slidably received and supported in the vertical guide or slide channels 26. By utilizing plates of substantial thickness and welding the same securely to the spacer blocks, a sturdy and rigid composite cross-head construction is had, capable of withstanding heavy loads. The spacer blocks 72 have an appreciable length (measured vertically) whereby no canting or jamming of the cross-heads can occur in the slide channels 26.

Power means are provided for effecting raising and lowering movement of the cross-heads 68, said means comprising hydraulic cylinders 76 mounted at their lower ends on base plates 78 secured to the under edges of the carriage channels 34. The hydraulic cylinders 76 have plungers 80 extending at their upper portions between the side plates 70 of the cross-heads and being pivotally connected thereto by wrist pins 82. The cylinders 76 are connected by fluid lines 84 with a hydraulic power unit 86 carried on a base plate 88 which straddles and is supported on the cross members 18 of the carriage frame construction. The hydraulic power unit 86 has an equalizer means by which the lift of each cylinder 76 is coordinated with that of the other, thereby insuring that the cross-heads 68 at all times occupy the same level or have the same height.

Figure 8:
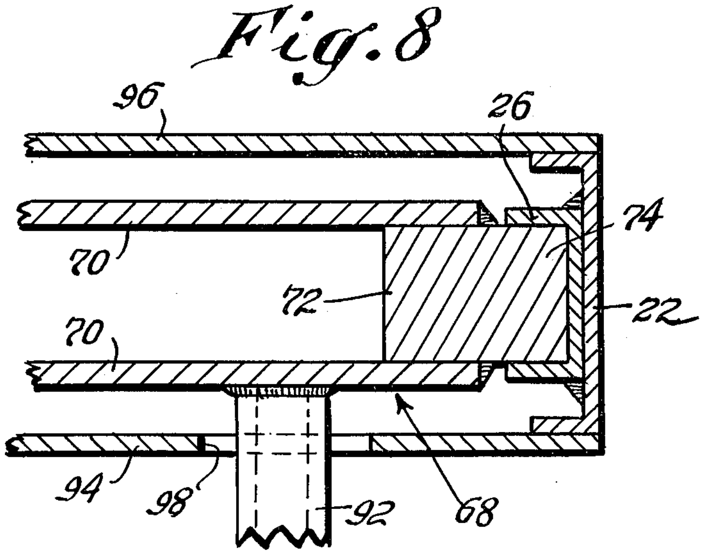
FIG. 8 is a fragmentary horizontal sectional view taken on the line 8—8 of FIG. 7.

Further, in accordance with the invention, the cross-heads 68 are joined to each other mechanically to insure simultaneously movement, by a pair of cross beams 90, 92, the latter being located at a level below the cross beam 90 and forwardly of the same in spaced parallel relation as seen in FIG. 7. The cross beams 90, 92 can be constituted each as a composite hollow welded seam structure (as shown), or the cross beams can be of solid steel stock of rectangular cross-section. As seen in FIG. 8, the cross beam 92 is welded to the inner side plates 70 of the cross-heads 68, a similar attachment being utilized for the cross beam 90.

The trucks 12 have inner and outer cover plates 94, 96 which can be removably secured in place by suitable screws, as will be understood. The inner cover plates 94 have clearance openings 98 to accommodate the cross beams 90, 92 and enable the same and the cross-heads 68 to have raising and lowering movement as effected by the hydraulic cylinders.

Referring now to FIGS. 2, 3, 5 and 6, the present invention provides fork structures 100 which are carried by the cross beams 90, 92, said fork structures including tines 102 which extend in directions laterally away from the beams and are adapted to support and carry sheared plate sections received from a power shear.

Each fork structure 100 has an upper bearing portion 104 from which there depends a hanger portion 106 mounting at its bottom extremity a sturdy tine 102. The bearing portions 104 have clearance spaces 108, 110 adapted to accommodate the cross beams 90, 92. At the clearance space 108, each bearing portion 104 has an upper anti-friction roller assemblage 112 and a plurality of lower anti-friction roller assemblages 114, adapted to engage respectively the top and bottom surfaces of the cross beam 90. At the clearance space 110 each bearing portion 104 of the fork structure 100 has single roller assemblages 116, 118 engageable with the top and a side surface of the front cross beam 92, and has a plurality of roller assemblages 120 engageable with the front surface of the cross beam 92. The lower extremity of the hanger portion 106 of each fork structure has a rearward reinforcing extension 122 disposed closely adjacent the front cross member 18 of the carriage construction, and if desired said member can constitute a backing therefor at such times that the tines 102 are carrying heavy loads. In such case, when the fork structures 100 are not loaded, the extensions 102 are spaced slightly from the adjacent cross member 18 and by virtue of the anti-friction roller assemblages that are provided, the fork structures can be readily moved along the lengths of the cross beams 90, 92 under modest manual power.

As provided by the present invention, the fork structures 100 have forwardly extending arms 124 provided with solenoid operated power grippers 126 in the form of clamps having opposed jaws 128, 130 adapted to receive and grip a sheared plate section as illustrated in FIG. 9. In this figure the plate section is indicated by the numeral 132 and is shown as being carried by arms 150 having rollers 152, of a conveyor 134 which is located at the discharge end of a power shear (not shown). The arms 124 of the fork structures are secured to the hanger portions 106 as by welding, and are reinforced by gussets 136 as shown.

The operation of the apparatus of the present invention can now be readily understood from the foregoing description. The fork structures 100 are raised or lowered to the desired height by providing power to the cylinders 76 so as to raise or lower the cross-heads 68 and the cross beams 90, 92. In connection with one mode of operation of the present apparatus, the arms 124 and gripper means 126 thereof are positioned to enable a sheared plate section 132 to be grasped by the grippers whereupon it can be pulled partially from the conveyor 134 by shifting the entire carriage rearwardly or to the right as viewed in FIG. 1. After a predetermined extend of movement of the carriage, the grippers are released and the fork structures 100 can then be raised an extent to bring the tines 102 higher, whereupon the sheared plate section 132 can be deposited on the tines 102. Prior to the above operation, the fork structures are shifted manually along the cross beams 90, 92 to locate them in the proper positions for handling the sheared plate section 132. As already mentioned, even though the fork structures 100 are of sturdy and heavy construction they can be readily manually shiftable by virtue of the anti-friction roller assemblages. Said assemblages, however, are sufficiently sturdy to enable heavy loads to be supported by the tines 102.

The above operation can be repeated a number of times to enable additional sheared plate sections to be handled and stacked on the tines 102 of the fork structures 100. Periodically, the carriage 10 can be shifted rearward to enable a fork lift truck to be brought in, and to remove the stacked sheared plate sections from the tines 102. Or, an alternative sequence of operations can be performed, as follows, being illustrated diagrammatically in FIG. 9. Here there is shown in outline the conveyor 132 that is located at the discharge end of the power shear. The conveyor has plate-supporting arms 150, provided with rollers 152, these being parts of the power shear (not shown). At the discharge end of the conveyor 134 there can be disposed a sloping plate-support device such as a framework 154 having rollers 156, such framework being adapted to receive from the conveyor 134 a sheared plate section 158. Such sheared plate section will be deposited under the action of gravity onto the stack 160 of plates carried by the lower tines 102 of the fork structures. The stack 160 is shown as being engaged with upright stop members 162 that are carried on the conveyor 134 of the power shear. In FIG. 9 the plate 132 is shown as gripped by the upper clamping arms 124 of the fork structures. Utilizing the power of the carriage, the plate 132 can be shifted either to the left or to the right to position it for a cut by the power shear. A number of such cuts can be made by use of the power of the carriage, moving the same either forward or rearward. After completion of one or more shearing operations on the metal plate stock, the cut plates are deposited on the conveyor 134 and moved one at a time to be deposited on the stack 160 carried by the lower tines 102. Periodically the carriage can be shifted rearward, away from the power shear, and the stack of plates 160 deposited on low blocks. The fork structures are then raised and the carriage moved forward over the deposited stack, to handle and pick up additional plate sections. At the desired time the stack of plate sections can be removed by an overhead crane or other suitable means.

As provided by the present invention, a unique system for bringing in power to the carriage 10 is provided, whereby the restricted area at the rear of the carriage is at all times cordoned off, for all advanced and retracted positions of the carriage. Such roping-off means comprises a pair of spring-loaded reels 140 mounted on the trucks 12 and carrying power cables 142 at waist height above the floor surface. The power cables extend horizontally to junction boxes 144 which are mounted on a fixed upright structure which may, for example, be a vertical wall 146 as illustrated in FIG. 1. Or, the junction boxes 144 can be carried by upright posts (not shown) spaced-apart a distance equal to the length of the carriage 10 and joined by a restraining rope or barrier (not shown). The spring loaded reels 140 have slip rings 148 and cooperable brushes 150 by which power is taken off the cables 142 and brought to the gear-head motor 46, the hydraulic unit 86, and the solenoids 152 of the power grippers 126. Thus, by the above arrangement there is had an automatic roping off of the restricted areas to the rear of the carriage 10 by the same means which brings in power to the carriage.

It will now be seen from the foregoing that I have provided a novel and improved, power-operated material handling apparatus which is especially adapted to handle heavy sheared plate sections that are received from a power shear, and to stack the plate sections whereby they can be conveniently removed by an overhead crane or a fork lift truck or other equipment. The apparatus is especially simple in its construction, while at the same time being extremely sturdy, fool-proof and capable of handling heavy work in a reliable manner and with a minimum amount of exertion being required of personnel employed to operate the equipment. The apparatus utilizes readily available metal stock such as I-beams, channels, structural steel plate and the like. The various parts are accessible for servicing and repair, and the functioning of the apparatus is simple to the extent that unskilled personnel can easily operate it.

Variations and modifications are possible without departing from the spirit of the invention.

I claim:

1. Powered material handling apparatus comprising, in combination:

(a) a carriage constituted as a frame construction having a pair of spaced-apart trucks provided with wheels to enable the trucks to travel in parallel directions while secured to the frame construction, (b) said frame construction including cross members rigidly connecting the trucks together,
(c) a pair of cross beams extending between the trucks,
(d) each truck having a cross-head to which the ends of the cross beams are secured,
(e) vertical guides on the trucks, engaged by the cross-heads and enabling the latter to have raising and lowering movement on the trucks,
(f) power means carried by the trucks, connected to said cross-heads for effecting the raising and lowering movement thereof,
(g) fork structures carried by said cross beams, including tines extending laterally away from the beams for supporting sheared plate sections, and
(h) anti-friction means carried by the fork structures, enabling the same to be moved along the lengths of the beams under manual power.

2. An apparatus as in claim 1, wherein:
(a) each fork structure comprises a bearing portion which carries the said anti-friction means, and a hanger portion depending from said bearing portion and mounting a tine of the fork structure.

3. An apparatus as in claim 2, wherein:
(a) said cross-heads comprise vertically and horizontally extending structures each having a horizontal width in excess of its vertical depth,
(b) said cross beams being secured at locations of the cross-heads which are both horizontally and vertically spaced apart,
(c) that cross beam which is closest to said hanger portions of the fork structures being secured at the lowest of said locations.

4. An apparatus as in claim 3, wherein:
(a) said anti-friction means comprising rollers carried by the said bearing portions of the fork structures and engaged with bottom and top surfaces of the cross beam disposed at the higher location, and comprising rollers carried by said bearing portions and engaged with the top and the two opposite side surfaces of the cross beam disposed at the said lower location.

5. An apparatus as in claim 4, wherein:
(a) said bearing portions of the fork structures each have three rollers engaged with the bottom surface of the cross beam disposed at the higher location.

6. An apparatus as in claim 4, wherein:
(a) said bearing portions of the fork structures each have three rollers engaged with a side surface of the cross beam disposed at the said lower location.

7. An apparatus as in claim 2, and further including:
(a) arms projecting from the hanger portions of the fork structures,
(b) said arms being disposed above and extending in spaced parallel relation to the tines of the fork structures, and
(c) powered grippers carried on the extremities of the arms,
(d) said grippers being adapted to clamp onto edge portions of a metal plate disposed on a conveyor and in a plane above the tines, for positioning the plate in readiness for performing an operation thereon,
(e) said plate being shifted on the conveyor when the frame construction and trucks are moved with respect thereto.

8. An apparatus as in claim 2, wherein:
(a) a cross-member of said frame construction extending closely adjacent the lower parts of said hangers and being adapted to constitute a reinforcing backing therefor when the tines of the fork structures are carrying heavy loads.

9. An apparatus as in claim 2, wherein:
(a) said cross beams have a rectangular cross-section and are disposed with their opposite narrow exposed surfaces lying in horizontal planes.

10. An apparatus as in claim 1, wherein:
(a) the cross-heads comprise pairs of heavy metal side plates and spacer blocks extending between and securing the plates in spaced relation,
(b) said spacer blocks having exposed runner portions cooperable with the vertical guides on the trucks.

11. An apparatus as in claim 10, wherein:
(a) the power means comprise hydraulic cylinders and plungers mounted on the trucks,
(b) said plungers extending between the said side plates, and
(c) wrist pins connecting the extremities of the plungers with the said side plates.

12. An apparatus as in claim 1, wherein:
(a) each truck has an upstanding housing portion comprising a pair of upright parallel, frame channels which are spaced apart and disposed with their flanges respectively facing each other, comprising spaced, back-to-back base channels secured to the bottoms of the upright channels, and comprising cross members attached to and disposed between the base channels,
(b) said vertical guides comprising upright slide channels nested within said frame channels,
(c) said cross heads comprising spaced-apart, parallel side plates and spacer blocks interposed between the side plates and having projecting runner portions disposed and slidable in said slide channels.

13. An apparatus as in claim 12, wherein:
(a) each truck comprises an additional pair of spaced, back-to-back channels disposed respectively below and secured to said base channels,
(b) said additional channels having journal bearings, and
(c) said wheels being disposed between the base and additional channels of said pairs, and being carried by means of said journal bearings.

* * * * *